United States Patent
Tojo et al.

(10) Patent No.: US 7,503,014 B2
(45) Date of Patent: Mar. 10, 2009

(54) MENU ITEM SELECTING DEVICE AND METHOD

(75) Inventors: Jun Tojo, Yokohama (JP); Takuma Sudo, Yokohama (JP)

(73) Assignees: Fujitsu Limited, Kawasaki (JP); NTT DoCoMo, Inc., Tokyo (JP)

( * ) Notice: Subject to any disclaimer, the term of this patent is extended or adjusted under 35 U.S.C. 154(b) by 302 days.

(21) Appl. No.: 10/890,282

(22) Filed: Jul. 14, 2004

(65) Prior Publication Data

US 2004/0250217 A1 Dec. 9, 2004

Related U.S. Application Data

(63) Continuation of application No. PCT/JP02/00424, filed on Jan. 22, 2002.

(51) Int. Cl.
*G06F 3/033* (2006.01)
(52) U.S. Cl. .................. 715/810; 715/243; 715/817; 715/818; 715/819; 715/820
(58) Field of Classification Search ................ 715/753, 715/810, 864–867, 243, 817, 818, 819, 820, 715/825, 834, 841, 845; 345/156, 157, 168
See application file for complete search history.

(56) References Cited

U.S. PATENT DOCUMENTS

| | | | |
|---|---|---|---|
| 5,898,435 A | 4/1999 | Nagahara et al. | |
| 5,986,638 A * | 11/1999 | Cheng | 715/857 |
| 6,037,937 A | 3/2000 | Beaton et al. | |
| 6,184,884 B1 | 2/2001 | Nagahara et al. | |
| 6,211,921 B1 * | 4/2001 | Cherian et al. | 348/565 |
| 6,366,302 B1 * | 4/2002 | Crosby et al. | 715/786 |
| 6,411,337 B2 * | 6/2002 | Cove et al. | 348/563 |
| 6,600,936 B1 * | 7/2003 | Karkkainen et al. | 455/566 |
| 2003/0164818 A1 * | 9/2003 | Miller-Smith | 345/173 |
| 2005/0086366 A1 * | 4/2005 | Luebke et al. | 709/238 |

FOREIGN PATENT DOCUMENTS

| | | |
|---|---|---|
| EP | 1 028 570 A1 | 8/2000 |
| JP | 09-097153 | 4/1997 |
| JP | 9-160739 | 6/1997 |

(Continued)

OTHER PUBLICATIONS

Sweetser et al.,Absolute Pointing and Tracking based Remote Control for Interactive User Experience, ThinkOptics, Inc., pp. 155-164.*

(Continued)

*Primary Examiner*—William L Bashore
*Assistant Examiner*—Meseker Takele
(74) *Attorney, Agent, or Firm*—Staas & Halsey LLP

(57) ABSTRACT

In order to provide a configuration with which a desired function can be started rapidly from a function menu of an electronic device having a plurality of functions together, a circular menu is displayed on a main LCD 21, a function item activated is shifted item by item in response to left-and-right directional operation of a cross-shaped key in a main operation part 25, and a function item located at the opposite position in the circular menu is activated in response to up-and-down directional operation of the same.

13 Claims, 20 Drawing Sheets

FOREIGN PATENT DOCUMENTS

| | | |
|---|---|---|
| JP | 11-095968 | 4/1999 |
| JP | 2000-231371 | 8/2000 |
| JP | 2000-283782 | 10/2000 |
| JP | 2001-69223 | 3/2001 |
| JP | 2001-268201 | 9/2001 |

OTHER PUBLICATIONS

Mizobuchi et al., Tapping vs. Circling Selections on Pen-based Devices, ACM pp. 607-614.*

Japanese Office Action dated Apr. 18, 2006 of Application No. JP 2003-562773.

* cited by examiner

MENU ITEM SELECTING DEVICE AND METHOD

This application is a continuing application, filed under 35 U.S.C. §111(a), of International Application PCT/JP2002/000424, filed Jan. 22, 2002.

TECHNICAL FIELD

The present invention relates to a menu item selecting device and method, and, in particular, to a devise and a method with which, in an electronic device such as a cellular phone, a personal computer or such, each function can be efficiently selected from a function menu displayed on an operation screen.

BACKGROUND ART

In an electronic device such as a cellular phone, a personal computer or such, having various functions together in a single unit, a problem of how to search for a function thereof and make it selectable rapidly is an important factor in order to efficiently operate these devices.

That is, although these electronic devices have many convenient functions, advantages therefrom may be reduced by half if a user cannot make full use thereof efficiently. Specifically, it can be said that one of important points for determining various specifications (in hardware or software) of the device is how to rapidly start so as to make it in a usable state a function a user wishes in an initial step of operating the device.

For example, Japanese Laid-open Patent Application No. 2001-136303 discloses a function by which many images of registered persons are displayed on a screen of a cellular phone, and, calling for a corresponding phone number is automatically performed as a result of a desired image being selected therefrom.

Japanese Laid-open Patent Application No. 2000-283782 discloses a function by which menu items to select are arranged circularly, and the respective menu items are displayed in a manner of rotating them clockwise or counter-clockwise.

Japanese Laid-open Patent Application No. 9-160739 discloses a function by which a polyhedron is rotated by means of a mouse, and thus, a side thereof on which a desired selection item is allocated is displayed.

In these prior arts, the following problems may occur:

In the art in which many images of facial portraits of registered persons are displayed, in case where a large number of persons are registered, much time is taken until an image including a relevant person is displayed since it is necessary to repeat page scrolling operation therefor.

In the art in which menu items are displayed circularly, the circular arrangement becomes longer as the number of menu items increases, and thus, also much time may be taken until a desired menu page is moved to the front.

Further, in the art in which a polyhedron is rotated and thus a side relevant to a desired item is selected, the polyhedron becomes longer in size and complicated as the number of selection items increases, and thus, it is expected that much time is taken until a desired side is searched for and thus is selected.

For example, in a case of, as shown in FIG. 1, a list menu display function in the prior art, items of A through F are displayed on a screen. When an item D is desired to be selected thereamong, a downward movement key should be operated thrice, and thus, much time is taken for selecting the desired item.

In another example of a list menu display mechanism in the prior art such as that shown in FIG. 2, and thus, in a case where an item M is desired to select for example from among items A through X in a configuration in which display of a row of items is switched to display of an adjacent row of items with operation of left-and-right directional movement keys, it is necessary to operate a right directional key twice for selecting the item M. Furthermore, in case of selecting an item P in the same row of the item M for example, it is necessary to further operate a downward key thrice. Thus, much time is taken for selecting the desired item.

DISCLOSURE OF INVENTION

The present invention has been devised in consideration of the above-mentioned problem, and, an object of the present invention is to provide a menu item selecting device and method by which, even if selection items amount to a large number of ones, a desired item can be selected within a relatively small amount of operation.

According to the present invention, menu items are arranged circularly or in a similar way, and a predetermined number of items are skipped when a direction, different from a direction along the arrangement, is designated. As a result, it is possible to reach a desired item rapidly even if the desired item is far from the current item, and thus, operation efficiency can be improved.

BEST MODE FOR CARRYING OUT THE INVENTION

A configuration of an embodiment of the present invention will now be described based on figures.

Figure 3:
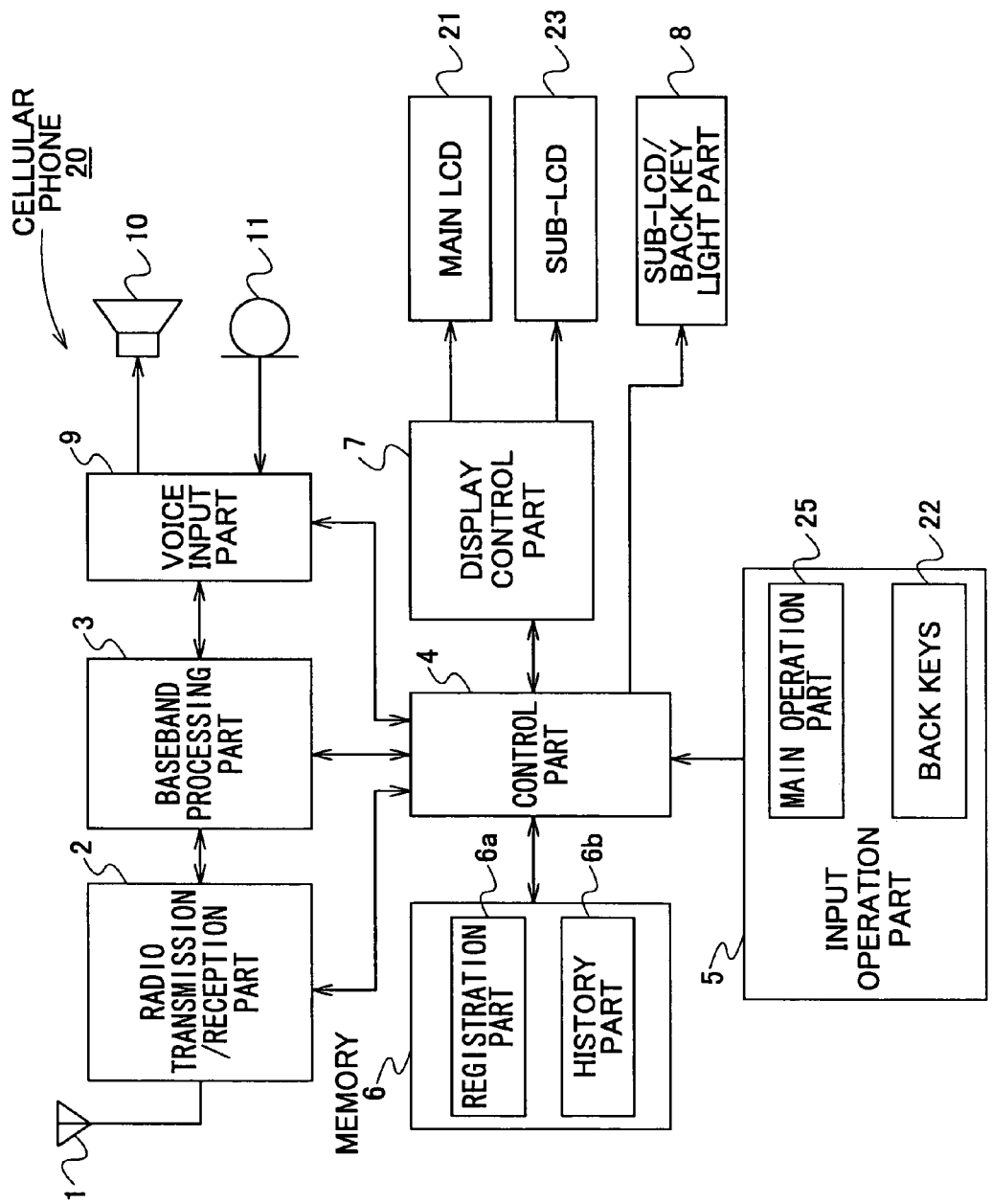
FIG. 3 shows a block diagram showing a configuration of a cellular phone in which a method of selecting a desired item from a circular menu in one embodiment of the present invention is applied.

FIG. 3 shows an internal block diagram of a cellular phone 20 which embodies a menu item selecting method according to the embodiment of the present invention.

The cellular phone 20 includes an antenna 1 for transmitting and receiving a signal to and from a base station, a radio transmission/reception part 2 processing a radio frequency signal transmitted/received via the antenna 1 so as to convert it into a voice signal or an image signal, or to perform the inverse signal conversion, a baseband processing part 3 and a voice input/output part 9, a speaker 10 and a microphone 11 performing input and output of a voice signal, a display control part 7 performing control of display of the image signal, a main LCD (liquid crystal display device) 21 and a sub-LCD 23, an input operation part 5 including a main operation part including various types of keys for a user to input operation and back keys 22, a memory 6 including a registration part 6a for registering various types of information such as phone numbers, mail addresses, URLs, or such and a history part 6b storing a history of operation, and a control part 4 performing total management and control of each of the above-mentioned respective parts. The above-mentioned main operation part 25 includes a key for inputting up/down and left/right direction operation, for example, a cross-shaped key, a fix key, and other function keys.

Figure 4:
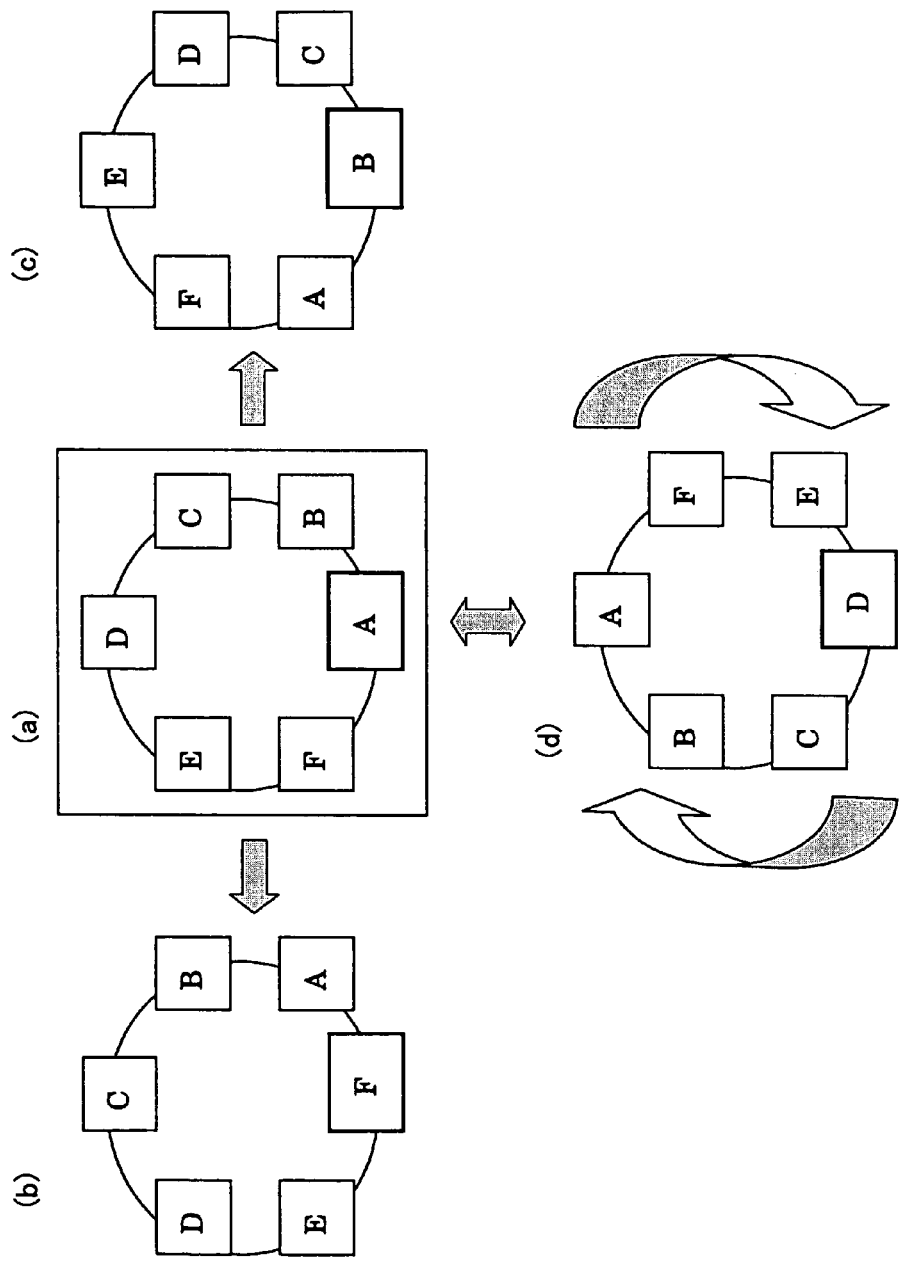
FIG. 4 shows the method of selecting a desired item from a circular menu in the embodiment of the present invention (#1)

FIG. 4 illustrates an example of operation according to the menu item selecting method in the embodiment of the present invention. Images (a), (b), (c), and (d) in FIG. 4 are displayed on a screen of the main LCD 25 shown in FIG. 3, and the respective alphabets letters A, B, C, D and F show respective items of an operation menu. An example of each of these menu items is: 'refer to a received mail', 'create a mail to transmit', 'display/register a phone book (address book)', 'display/update a schedule table (scheduler)' or such.

According to the present embodiment, as shown, the respective menu items are arranged circularly. For example, in a display state shown in FIG. 4, (a), the item A is located at the very front position, and, in this state, the item A is in an active condition. For example, assuming that a function of the item A is 'refer to a received mail', this function is started when the user operates a fix key on the above-mentioned main operation part 25 in this state. Thereby, the user can freely refer to a received mail (the contents of which are stored in the registration part 6a of the above-mentioned memory 6, and the contents are made to be displayed on the main LCD 21) by operating respective keys on the main operation part 25.

When the user wishes to use another function, for example, to perform the function of 'create a mail to transmit' and it is assumed that a relevant function key is of the item F, the user operates the cross-shaped key in a right direction. As a result, an operation input signal from this key operation is sent to the control part 4 which then processes it. As a result, the control part 4 sends a control signal to the display control part such as to rotate the display on the main LCD 21 in a right direction along the menu arrangement direction into a state shown in FIG. 4(b). As a result, the display state shown in FIG. 4(b) occurs, thus, the item F is located at the front position and becomes active. Then, when the fix key is pressed in this state, the control part 4 executes control such as to start the function of 'create a mail to transmit' corresponding to the item F. As a result, the user can freely create a mail to transmit by operating respective keys on the main operation part 25. The contents of a thus-created mail to transmit are also stored in the registration part 6a of the memory 6, and, then, by operating the main operation part 25, it is possible to transmit the thus-stored contents for a relevant destination address registered in the registration part 6a.

Further, in a case where the operator wishes to use a function corresponding to the item D (for example, the function of 'refer to/update a schedule table'), in a state in which the item A is located at the very front position as shown in FIG. 4(a) where the item A is in the active condition, the user operates the cross-shaped key in an up direction. By this operation, the same as the above, a corresponding operation input signal is sent from the input operation part 5 to the control part 4. The control part 4 then sends a control signal to the display control part 7 such as to rotate the menu arrangement by 180 degrees, as shown in FIG. 4(d). As a result, the menu arrangement displayed on the main LCD 21 is rotated 180 degrees along the arrangement direction, and thus, as shown, the item D which is located opposite to the item A comes to the front position at this time. When the fix key is pressed in this state, the control part 4 performs control such as to start the function of 'refer to/update a schedule table' corresponding to the item D. As a result, the user can freely refer to or update a schedule table with the use of the main operation part 25 as well as the main LCD 21. The contents of the schedule table are stored in the registration part 6a of the memory 6, and are automatically updated in response to updating operation. The sequence of these operations is executed as a result of the predetermined respective parts being operated under the control of the control part 4

In a case where another item, for example, the item B is selected from the state shown in FIG. 4(a), the cross-shaped key is operated in a left direction, thereby the menu displayed on the main LCD 21 is rotated item by item in a left direction along the arrangement direction through a control operation such as that mentioned above. As a result, the screen shows a state shown in FIG. 4(*c*), in which B is located at the front position and becomes active. Then, when the fix key is pressed in this state, a corresponding function is started by control operation of the control part 4.

In order to select the item E from the state of FIG. 4, (*a*), once the cross-shaped key is operated in an up direction so that the state shown in FIG. 4, (*d*) is made to appear. After that, the cross-shaped key is operated in a left direction, and thus, the same as the above, the menu displayed on the main LCD 21 rotates in a left direction. As a result, the E comes to the front position.

Thus, according to the embodiment of the present invention, in the case of the menu of total six items such as that shown, the number of times of operations required for selecting any item is not more than two. In contrast thereto, in the prior art, thrice of operations are needed in case of selecting the item D in the case of FIG. 1. As can be clearly seen from these examples, it is possible to effectively reduce time required to select a desired item according to the present invention.

Figure 5:
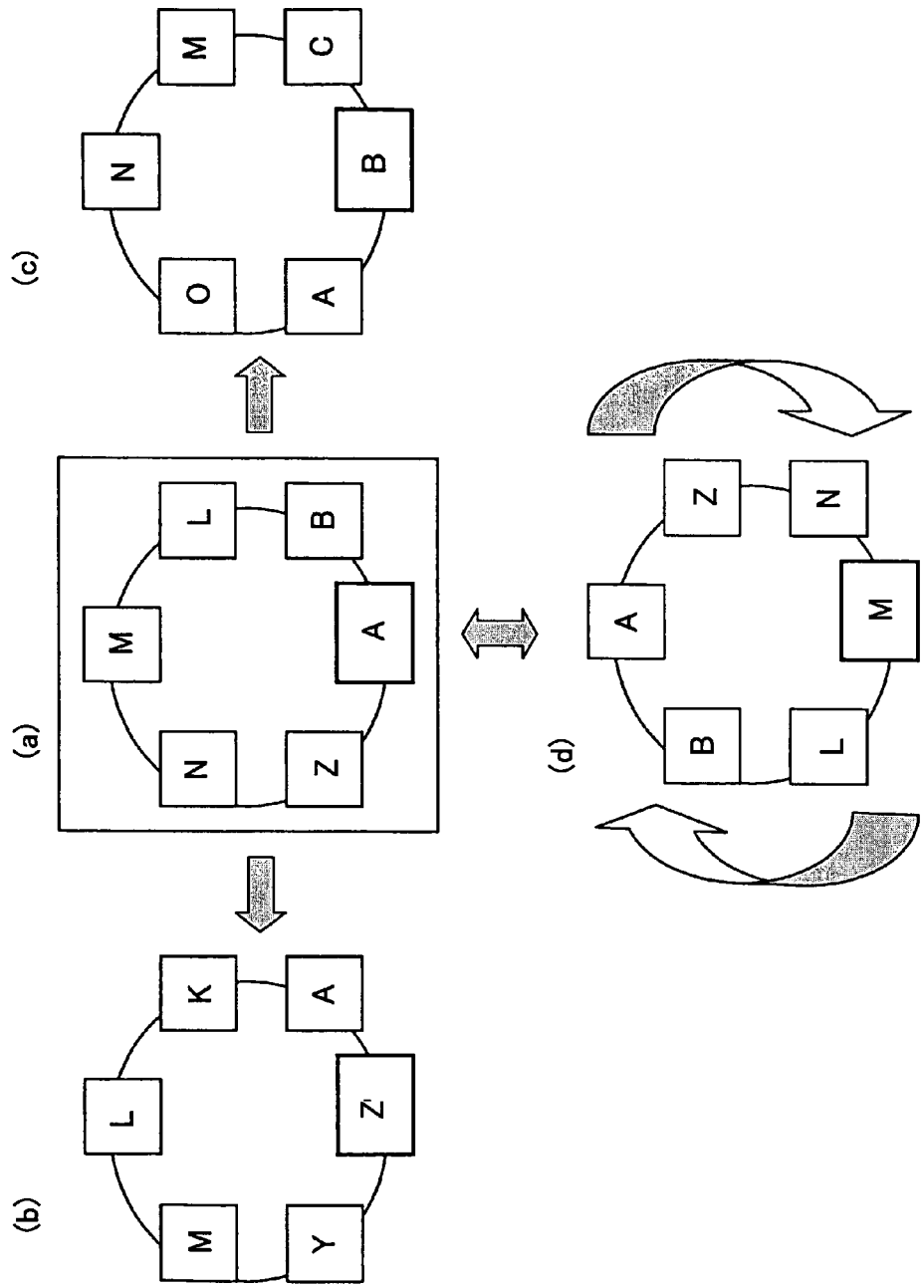
FIG. 5 shows the method of selecting a desired item from the circular menu in the embodiment of the present invention (#2)
Figure 6:
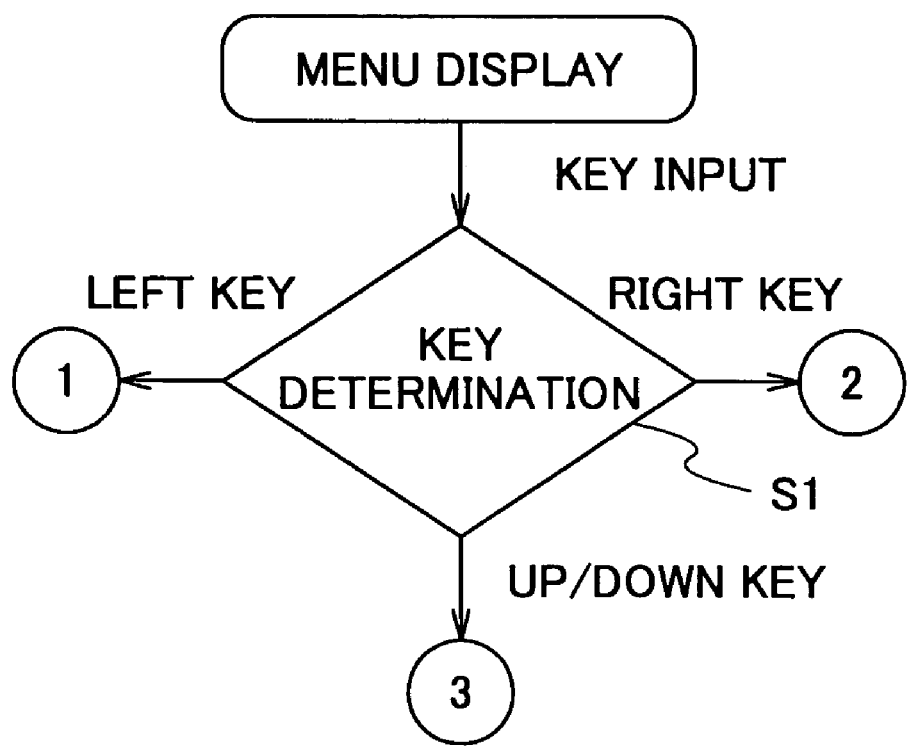
FIG. 6 shows a flow chart illustrating operation in the menu item selecting method in the embodiment of the present invention (#1)

FIG. 5 illustrates an example in which the number of items increases from six according to the embodiment of the present invention. This figure shows an example in which menu items include total 26 items, i.e., A through Z. However, since it is difficult to display all the 26 items in terms of the display space, some of them, i.e., nothing other than three items of a front side (i.e., lower side) and three items of rear side (i.e., top side) are displayed, as shows, in the present embodiment (specifically, in the case of FIG. 5(*a*), respective items of C through K and O through Y are not displayed, or they are hidden). In this case, in response to operation of the cross-shaped key in a left/right direction, the circular display menu rotates item by item along the arrangement direction as shown in FIG. 5(*b*) and FIG. 5(*c*). On the other hand, in response to operation of the cross-shaped key in an up/down direction, such rotation is automatically performed along the arrangement direction that the item located at the opposite position of the menu items (in the example of the figures, M with respect to A) comes to the front position. In this case, it is possible to skip up to the item located at the opposite position in the case where the respective items are arranged circularly, by single operation. Accordingly, it is possible to remarkably reduce the required time and operation amount in comparison to the case of the prior art. Further, as a result of only the limited number of items located in the front part and the opposite part being displayed, the display is simplified, the required processing amount can be reduced and also a display manner easy to view is achieved.

Based on FIGS. 6 through 11, operation in the menu item selecting method according to the embodiment of the present invention is described next in further details.

First, in a state in which a menu is displayed on the main LCD 21 (for example, in the state shown in FIG. 4, (*a*)), the control part 4 determines operation of the cross-shaped key on the main operation part 25 made by a user. When the result of the determination indicates operation in a left direction, the control part 4 performs operation shown in FIG. 7. When the result indicates operation in a right direction, the control part 4 performs operation shown in FIG. 8. When the result indicates operation in an up/down direction, the control part 4 performs operation shown in FIG. 9.

Figure 7:
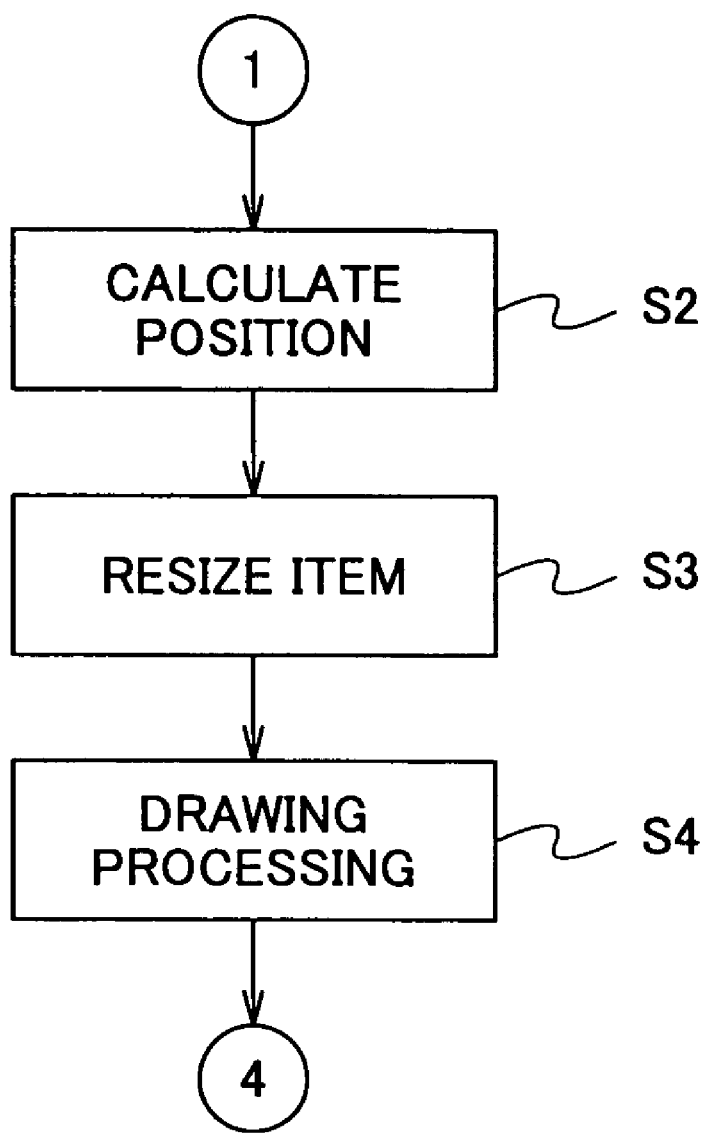
FIG. 7 shows a flow chart illustrating operation in the menu item selecting method in the embodiment of the present invention (#2)
Figure 11:
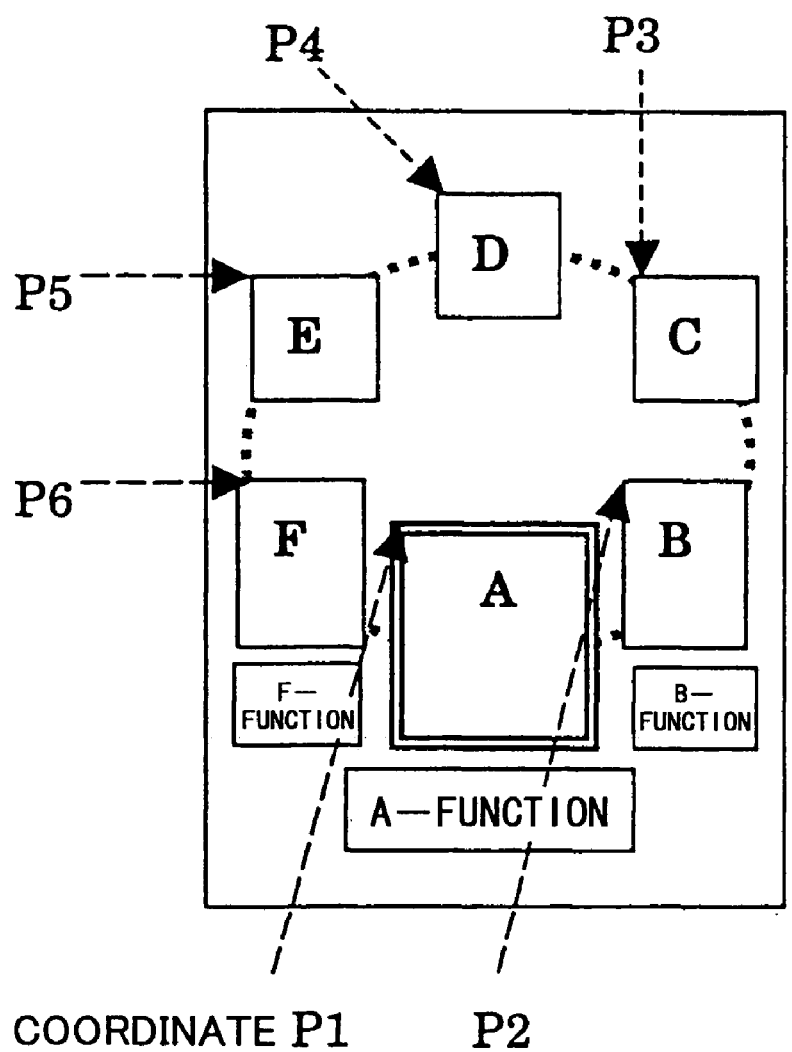
FIG. 11 shows an example of displaying the circular menu (especially, showing coordinate positions) for illustrating operation in the menu item selecting method in the embodiment of the present invention.
Figure 12:
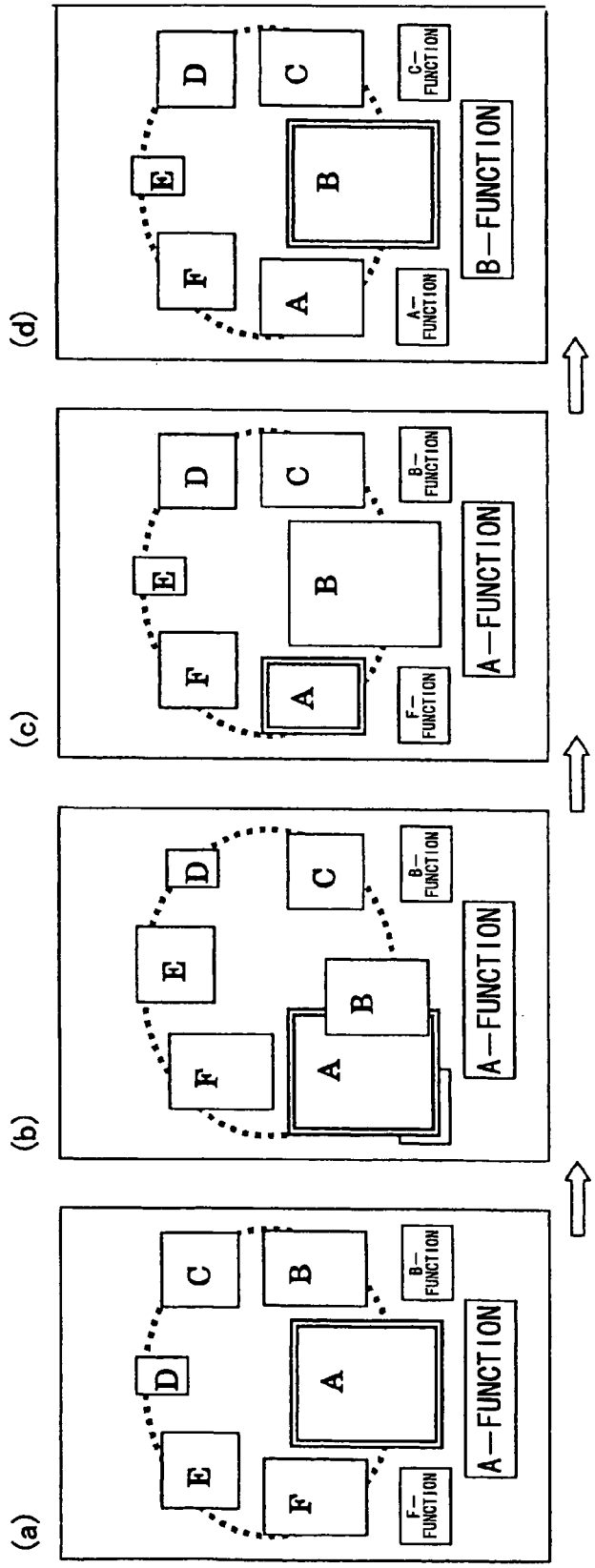
FIG. 12 shows an example of displaying the circular menu (at a time of left direction operation) for illustrating operation in the menu item selecting method in the embodiment of the present invention.

In the operation of FIG. 7, first, in Step S2, the control part 4 obtains items (A through F) currently located at respective coordinates P1 through P6 on the main LCD 21 shown in FIG. 11 (corresponding to FIG. 4, (*a*)), and performs control such as to shift the coordinates of the items thus obtained item by item in sequence in a left direction (P6→P5, ..., P1→P6). As a result, the displayed image changes in its state as shown in FIGS. 12, (*a*) to (*b*).

Figure 18:
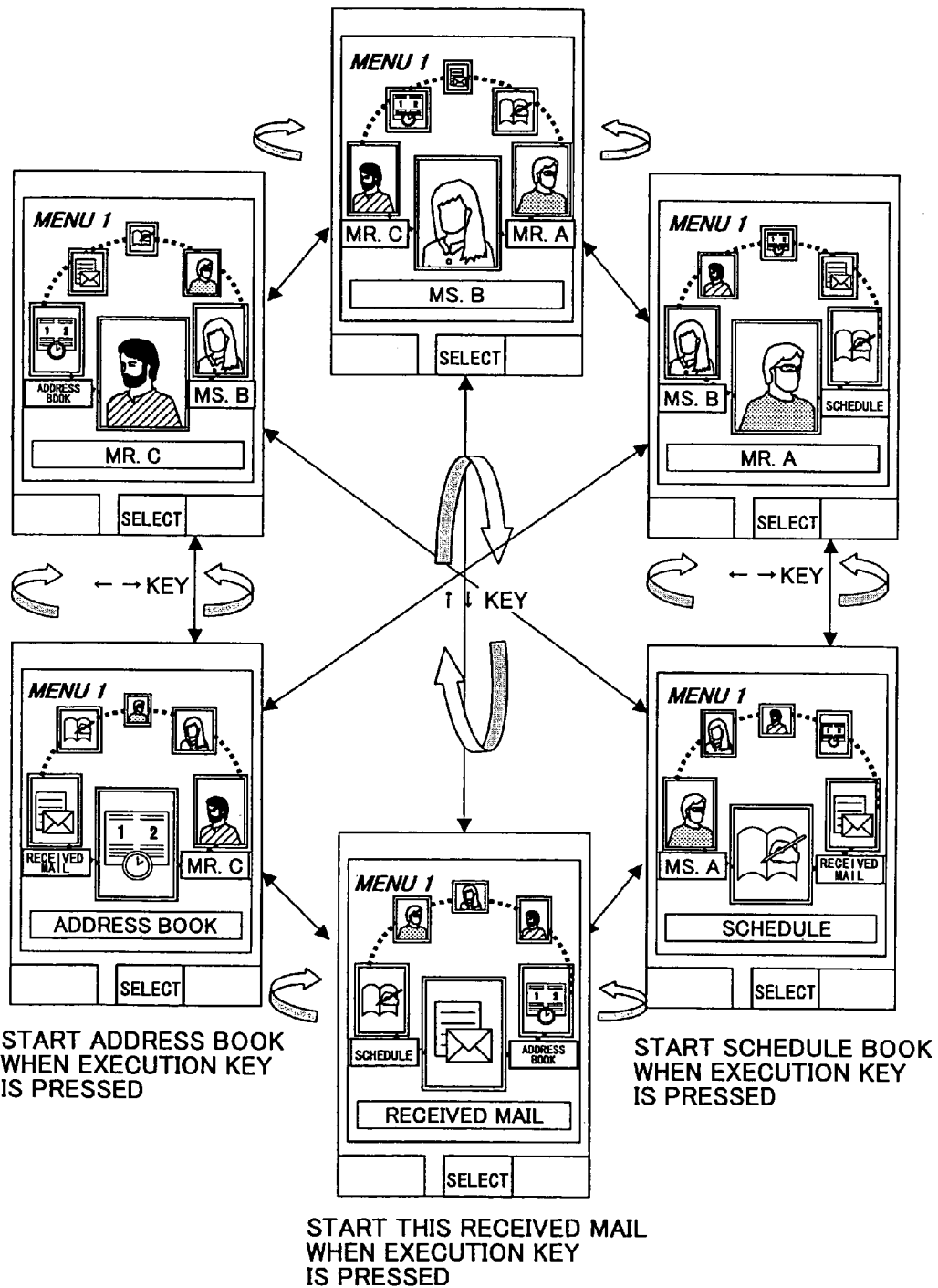
FIG. 18 shows a specific example of menu display in the menu item selecting method in the embodiment of the present invention.

After that, the control part 4 performs control to alter display sizes of the items, i.e., performs item resizing (Step S3). That is, control is made such that, as shown in FIG. 11, the front item is displayed in a larger size, while the display size is made smaller as the item moves toward the opposite end. As a result, the display image changes in its state as shown in FIGS. 12, (*b*) to (*c*). Then, in Step S4, drawing processing is performed. That is, by the display control part 7, processing is performed so that each item is displayed in size altered in Step S3 on the main LCD 21. At this time, processing is performed such as to display the item at the front end most clearly (or sharply) while to display other items intentionally blurry in sequence by defocusing, and thus, to perform display to emphasize which is an item to be selected (i.e., the active item) in response to the 'fix key' being pressed in a subsequent step. Furthermore, as shown in FIG. 18, control is performed such that, at least for the item at the front end, an item name or a corresponding function name is displayed in text, and thus, the user can further easily recognize the active item.

Figure 10:
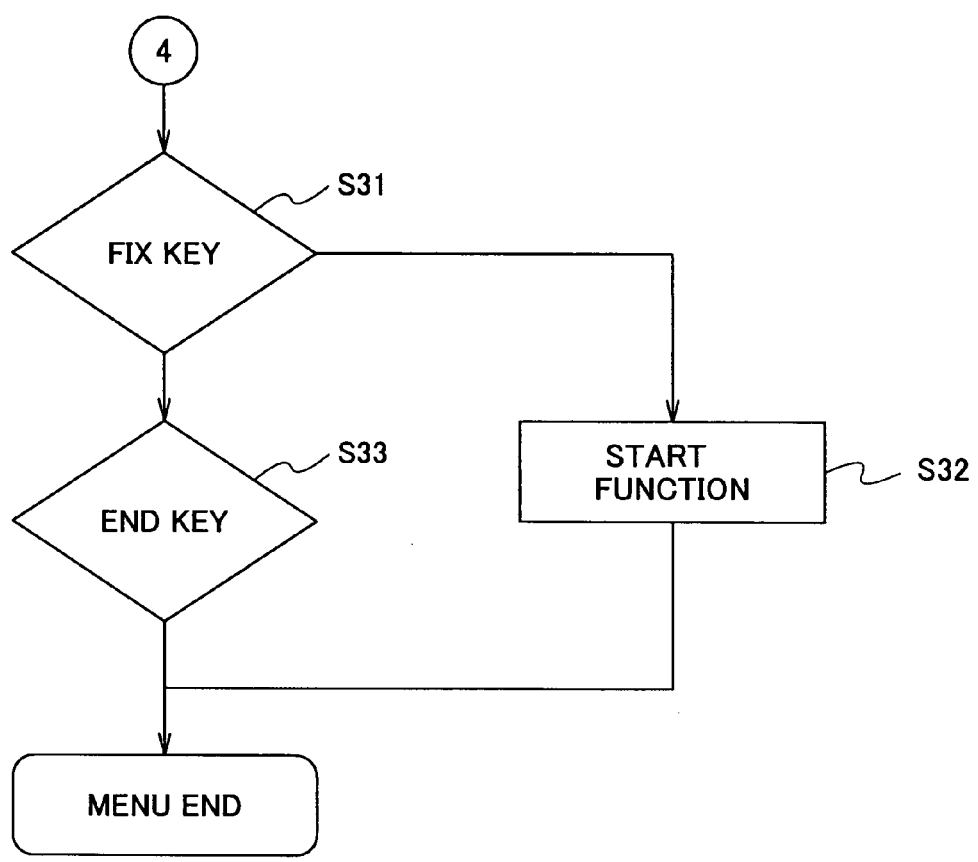
FIG. 10 shows a flow chart illustrating operation in the menu item selecting method in the embodiment of the present invention (#5)

Then, in Step 31 of FIG. 10, the control part 4 determines whether or not the 'fix key' on the main operation part 25 has been operated. When the result shows that it has been operated, the control part 4 starts the function corresponding to the item (active item) currently located at the front end (coordinate P1) in Step S32. As a result, the displayed image on the main LCD 21 changes in its state as shown in FIGS. 12, (*c*) to (*d*). Further, the control part 4 determines whether or not an 'end key' on the operation part 25 has been pressed by the user after operation by the above-mentioned function is finished. When the end key has been operated, the menu display on the main LCD 21 is finished.

Figure 8:
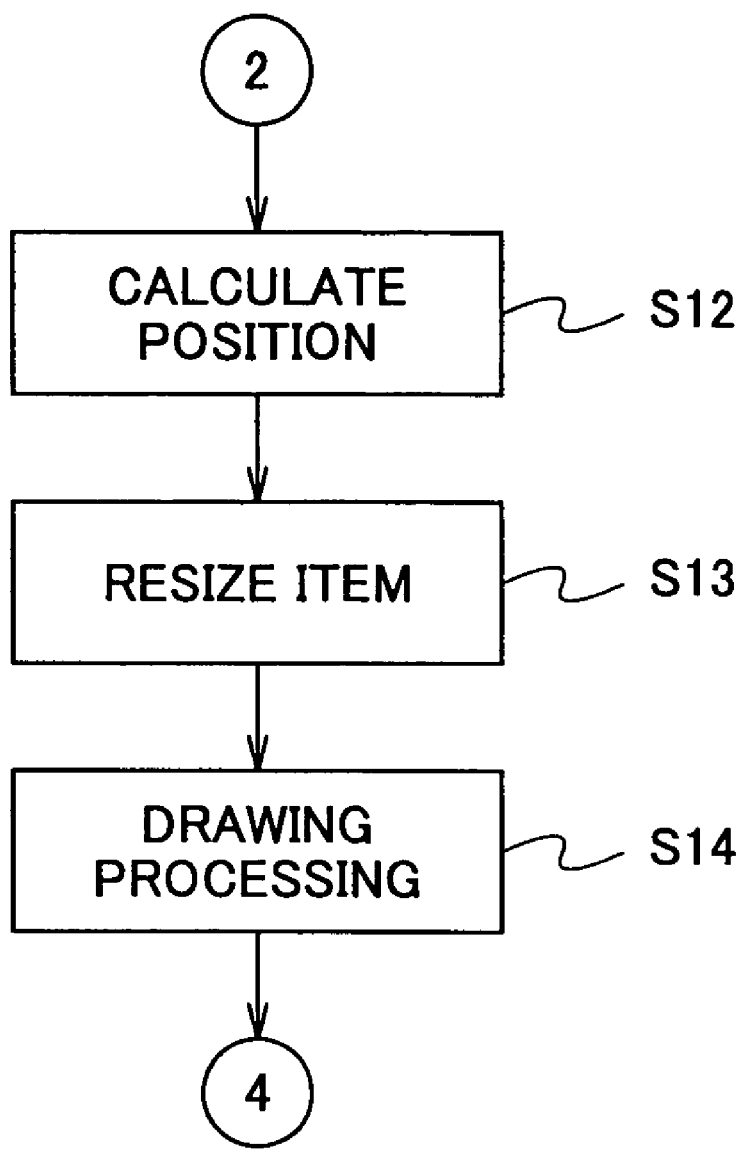
FIG. 8 shows a flow chart illustrating operation in the menu item selecting method in the embodiment of the present invention (#3)
Figure 9:
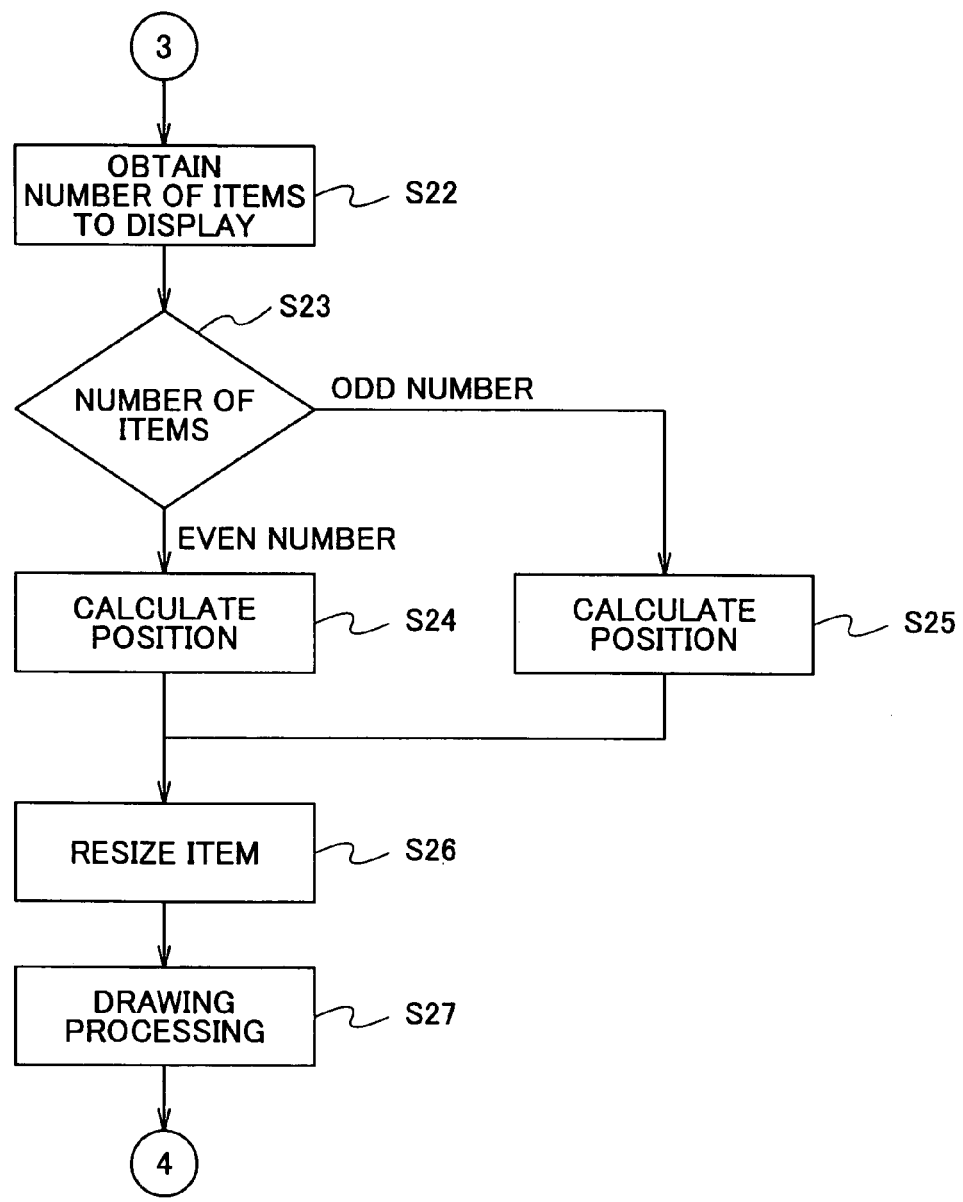
FIG. 9 shows a flow chart illustrating operation in the menu item selecting method in the embodiment of the present invention (#4)
Figure 13:
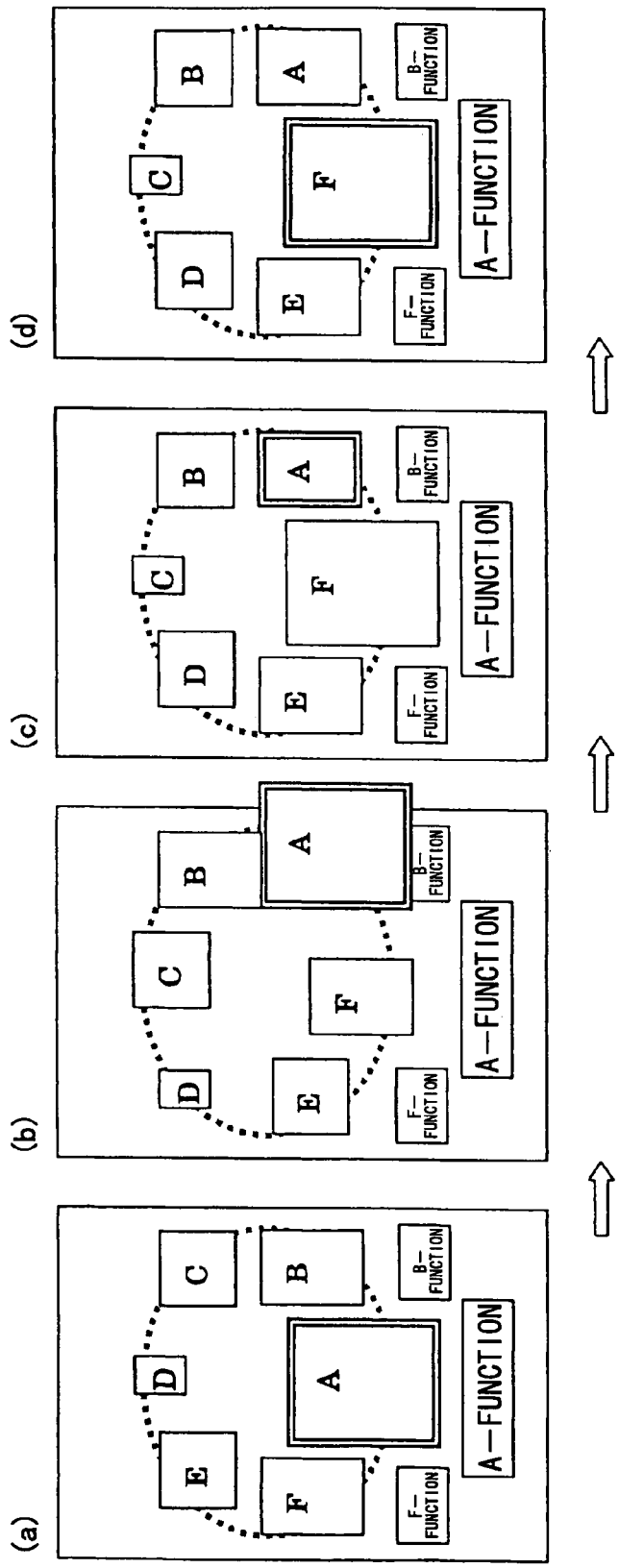
FIG. 13 shows an example of displaying the circular menu (at a time of right direction operation) for illustrating operation in the menu item selecting method in the embodiment of the present invention.

In the operation in FIG. 8, first, in Step S12, the control part 4 obtains items (A through F) currently located at respective coordinates P1 through P6 in the main LCD 21 shown in FIG. 11 (corresponding to FIG. 4, (*a*)), and performs control such as to shift the coordinates of the items thus obtained item by item in sequence in a right direction (P1→P2, ..., P6→P1). As a result, the displayed image changes in its state as shown in FIGS. 13, (*a*) to (*b*).

After that, the control part 4 performs control to alter display sizes of the items, i.e., performs item resizing (Step S13). That is, control is made such that, as shown in FIG. 11, the front item is displayed in a larger size, while the display size is made smaller as the item moves toward the opposite end. As a result, the display image changes in its state as shown in FIGS. 13, (*b*) to (*c*). Then, in Step S14, drawing processing is performed. That is, by the display control part 7, processing is performed so that each item is displayed in size altered in Step S13 on the main LCD 21. At this time, processing is performed such as to display the item at the front end most clearly (or sharply) while to display other items intentionally blurry in sequence by defocusing, and thus, to perform display to emphasize which is an item to be selected (i.e., the active item) when the 'fix key' is pressed in a subsequent step. Furthermore, as shown in FIG. 18, control is performed such that, at least for the item at the front end, an item name or a corresponding function name is displayed in text, and thus, the user can further easily recognize the active item.

Then, in Step 31 of FIG. 10, the control part 4 determines whether or not the 'fix key' on the main operation part 25 has been operated. When the result shows that it has been operated, the control part 4 starts the function corresponding to the item (active item) currently located at the front end (coordinate P1) in Step S32. As a result, the displayed image on the main LCD 21 changes in its state as shown in FIGS. 13, (c) to (d). Further, the control part 4 determines whether or not the 'end key' on the operation part 25 has been pressed by the user after operation by the above-mentioned function is finished. When the end key has been operated, the menu display on the main LCD 21 is finished.

A case where the cross-shaped key is operated in an up/down direction (FIG. 9) is described next. In this case, FIG. 14 (in a case where the number of items is an even number) and FIG. 15 (in a case where the number of items is an odd number) show corresponding change in display state.

First, the control part 4 obtains the number of display items in Step S22. That is, in the case of FIG. 4, they are six items in total, i.e., A through F. Then, in Step S23, it is determined whether this number of items is an even number or an odd number. When it is an even number as a result (i.e., the example of FIG. 4 or such), the items currently located in the respective coordinate positions are obtained in Step S24, the same as in the Step S2 or S12. After that, the number of items obtained in Step S22 is halved, and, processing is performed in which the display menu is rotated for the number of items thus resulting therefrom. In the example shown in FIG. 4, 6/2=3, and thus, processing is performed in which the coordinates are moved so that the menu is rotated for three items (FIGS. 14, (a)→(b)→(c)→(d)). Then, the same as in Step S3 or S13, item resizing is performed in Step S26, and thus, the sizes of the items are controlled (FIGS. 14, (d) to (c)).

Figure 14:
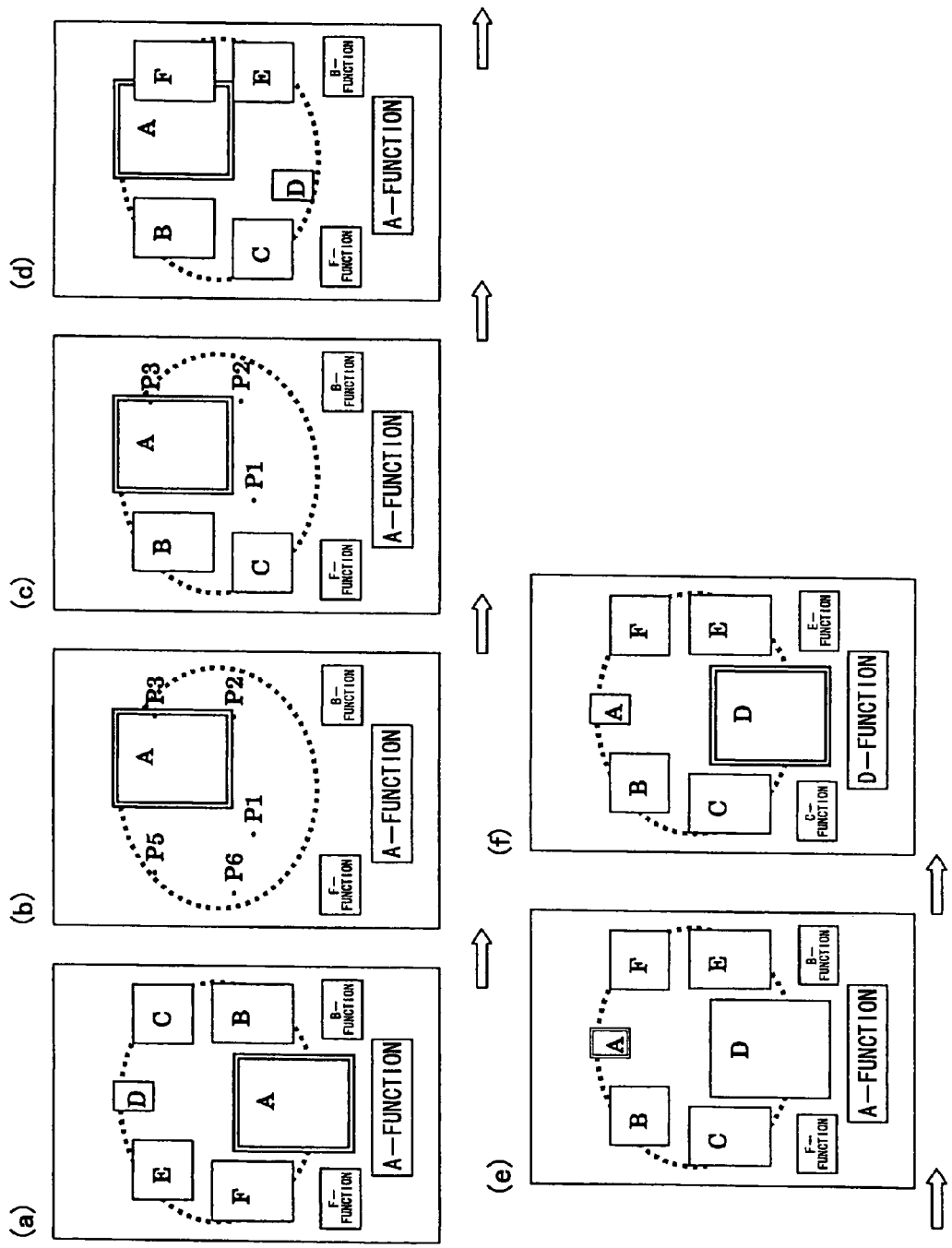
FIG. 14 shows an example of displaying the circular menu (at a time of up-and-down direction operation in a case where the number of items is an even number) for illustrating operation in the menu item selecting method in the embodiment of the present invention.

Then, in Step S31 of FIG. 10 the same as the above, the control part 4 determines whether or not the 'fix key' has been pressed by the user. When it has been pressed as a result, the function corresponding to the item (active item) currently located at the front end (coordinate P1) is executed in Step S32. As a result, the display image on the main LCD 21 changes in its state as shown in FIGS. 14, (e) to (f). Further, the control part 4 determines whether or not the 'end key' on the operation part 25 has been pressed by the user after the operation of the above-mentioned function is finished. When the end key has been operated, the menu display on the main LCD 21 is finished.

When the number of items is an odd number (for example, in a case of seven items), different from the case in Step S24, 1 is added to the quotient obtained from the number of items being halved in Step S25. In the above-mentioned example (7 items), 7/2=3 with the remainder of 1, and then, 3+1=4. Accordingly, processing is performed in which the menu is rotated for four items (FIGS. 15, (a)→(b)→(c)→(d)). Then, the same as in Step S3 or S13, item resizing is performed in Step S26, and thus, the sizes of the items are controlled (FIGS. 15, (d) to (c)).

Figure 15:
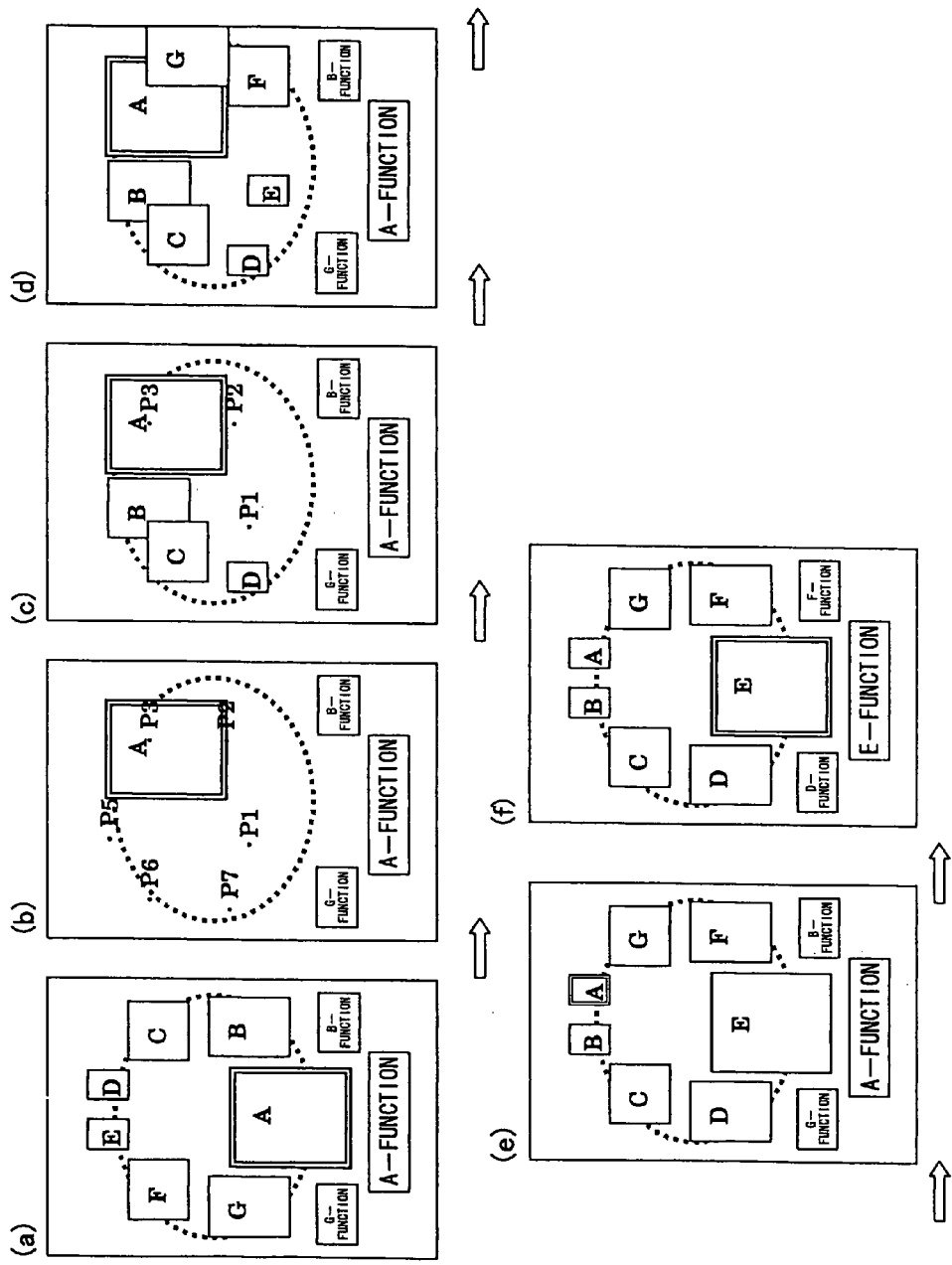
FIG. 15 shows an example of displaying the circular menu (at a time of up-and-down direction operation in a case where the number of items is an odd number) for illustrating operation in the menu item selecting method in the embodiment of the present invention.

Then, in Step S31 of FIG. 10, the control part 4 determines whether or not the 'fix key' has been pressed by the user. When it has been pressed as a result, the function corresponding to the item (active item) currently located at the front end (coordinate P1) is executed in Step S32. As a result, the display image on the main LCD 21 changes in its state as shown in FIGS. 15, (e) to (f). Further, the control part 4 determines whether or not the 'end key' on the operation part 25 has been pressed by the user after the operation of the above-mentioned function is finished. When the end key has been operated, the menu display on the main LCD 21 is finished.

It is not necessary to be limit to the above-mentioned example, and, without adding 1 to the quotient of the halving, the original value may be used. In this case, the menu is rotated for three items in the above-mentioned example.

Figure 1:
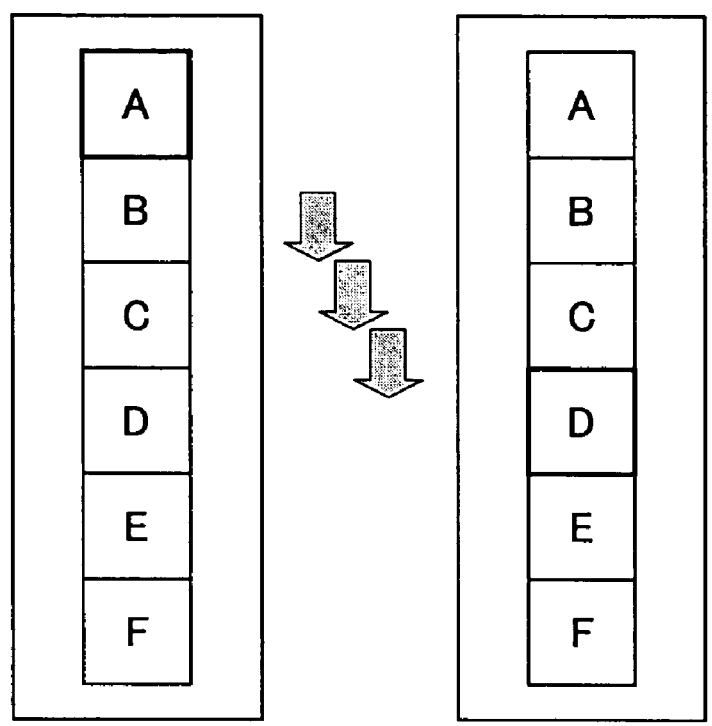
FIG. 1 shows one example of a method of selecting a desired item from a list menu in the prior art.
Figure 2:
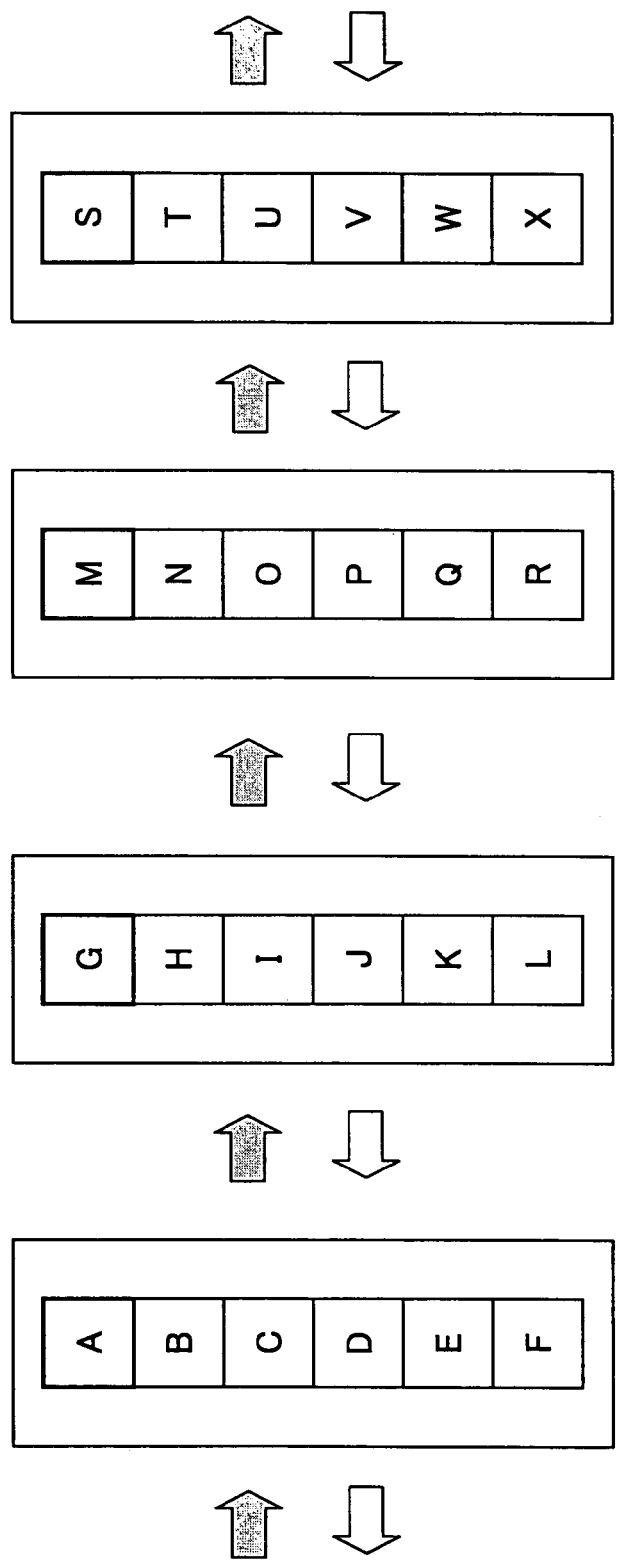
FIG. 2 shows another example of a method of selecting a desired item from a list menu in the prior art.
Figure 16:
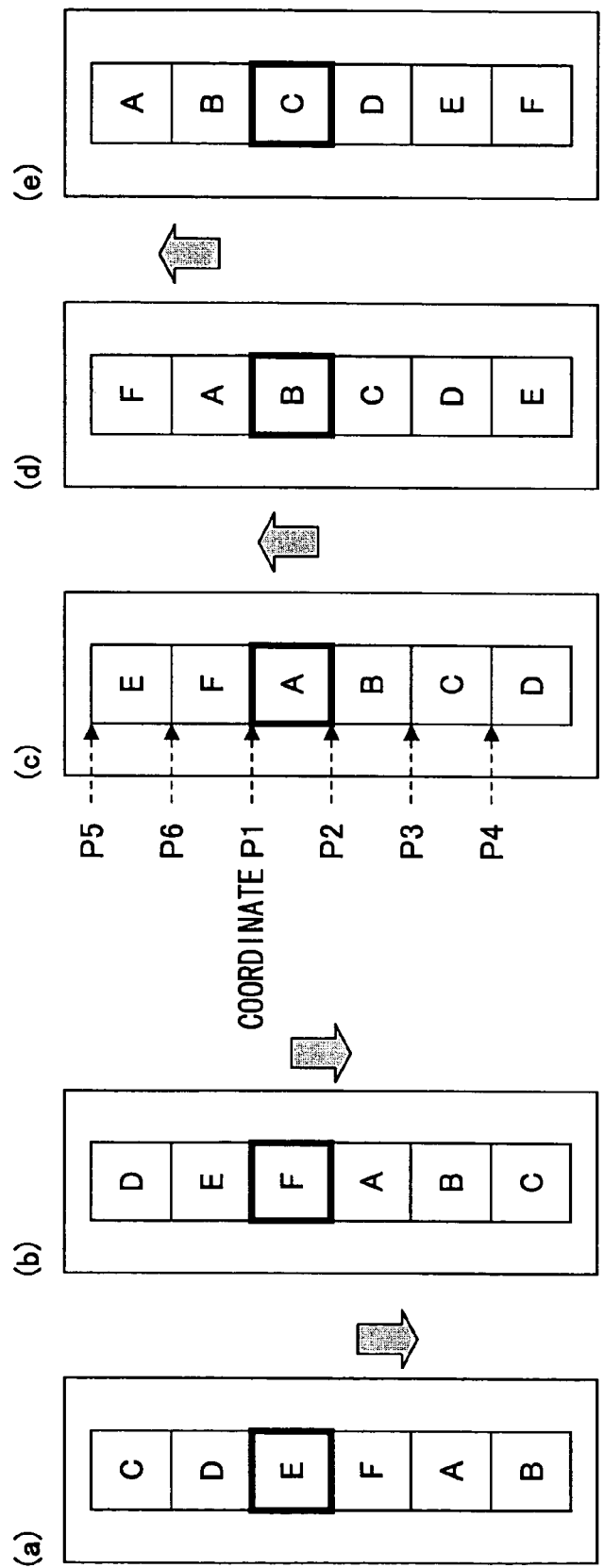
FIG. 16 shows another example (list form) of menu display (at a time of up-and-down direction operation) in the menu item selecting method in the embodiment of the present invention.
Figure 17:
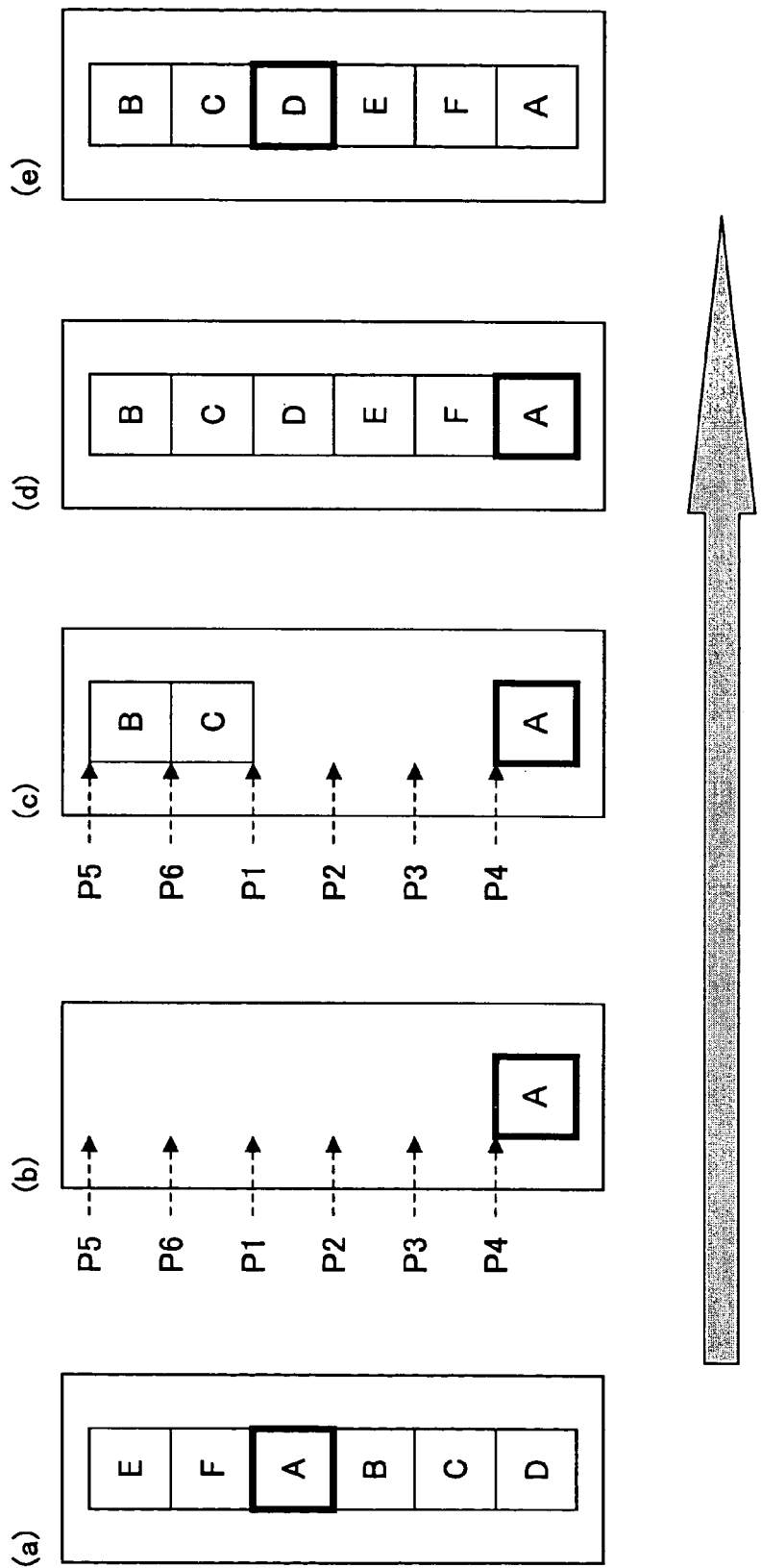
FIG. 17 shows another example (list form) of menu display (at a time of left-and-right direction operation) in the menu item selecting method in the embodiment of the present invention.

FIGS. 16 and 17 shows a variant embodiment in which the embodiment of the present invention is applied to a display way, apparently in a list form, such as that shown in FIG. 1 or such.

In this variant embodiment, when the cross-shaped key is operated in an up/down direction, as shown in FIG. 16, the items moves upward item by item vertically. However, an item which overflows from the screen at one end then appears at the opposite end in sequence. That is, in a case of FIGS. 16, (a) to (b), the menu moves upward, and an item C overflowing upward then appears at the bottom end. That is, it is possible to regard that the top end and the bottom end of the vertical arrangement of the items are connected to form a ring.

In this variant embodiment, when the cross-shaped key is operated in a left/right direction, skipping is performed toward an item corresponding to an opposite position assuming that the above-mentioned six items are arranged circularly, as shown in FIG. 17. That is, the same as in FIG. 4, skipping is performed from the item A to the item D. An amount of vertical movement occurring at this time is, the same as in FIG. 9, for the number of items obtained as a result of the number of all the items being halved. Also in this case, the same as in the above-mentioned case of operation in the up/down direction, items overflowing in response to the vertical movement are connected to the opposite end item by item (FIGS. 17, (a) through (e)).

Thus, according to the present invention, by key operation different from predetermined key operation for moving items one by one (for example, operation in an up/down direction with respect to operation in a left/right direction, or such), skipping operation can be easily made to occur. Further, since it is possible to replace a half (a front half, a lower half or such) of a menu with the other half by simple operation for the menu display including many items, it is possible to reach a desired item within short time with a reduced operation amount.

FIG. 18 shows an example of display on a display device (main LCD) in a case where a method according to the above-mentioned embodiment is applied to a cellular phone.

The present invention may be applied to various ways of menu display other than the configuration in the above-described embodiment. That is, the present invention can be applied to any case in which a menu can substantially employ a ring configuration.

Further, a means by which a menu item is selected or operated is not limited to the cross-shaped key, and, any operating means (for example, ten keys or such) which enables a plurality of different key operations may be used therefor.

Furthermore, although an item at the front position is activated in the above-described embodiment, it is not necessary to limit to this example, and a predetermined position may be applied. Further, it is not necessary to limit to position, and, a configuration may be provided in which an item clearly displayed is changed in sequence without change in its position, and the item clearly displayed is selected.

Figure 19:
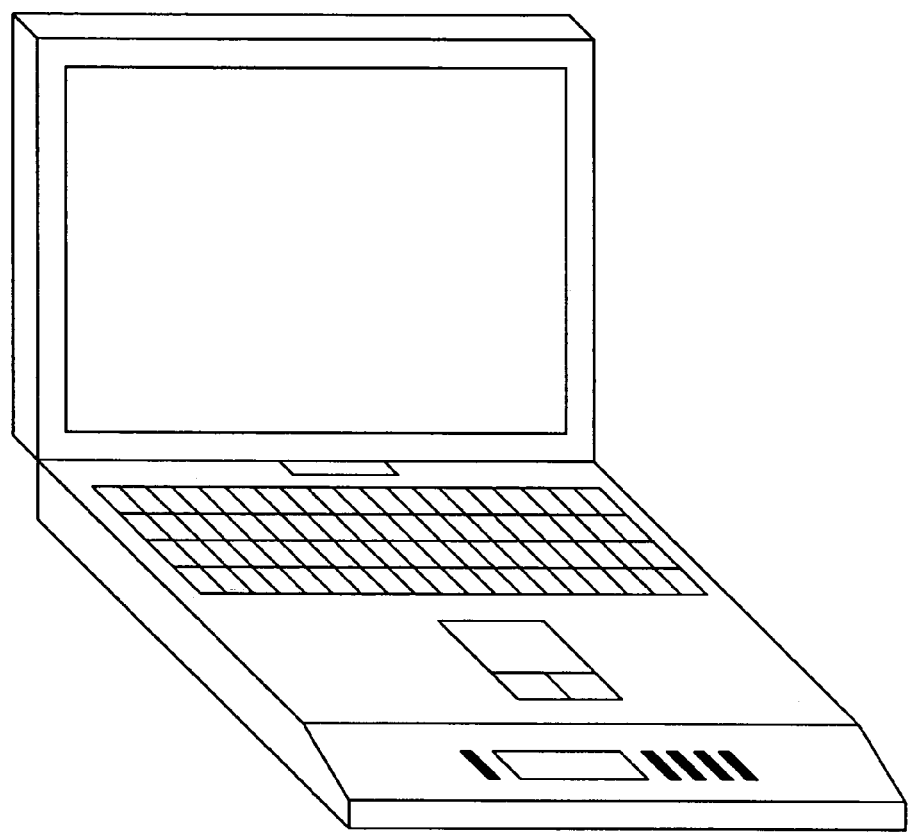
FIG. 19 shows a perspective view of a notebook-type personal computer to which the present invention is applicable.
Figure 20:
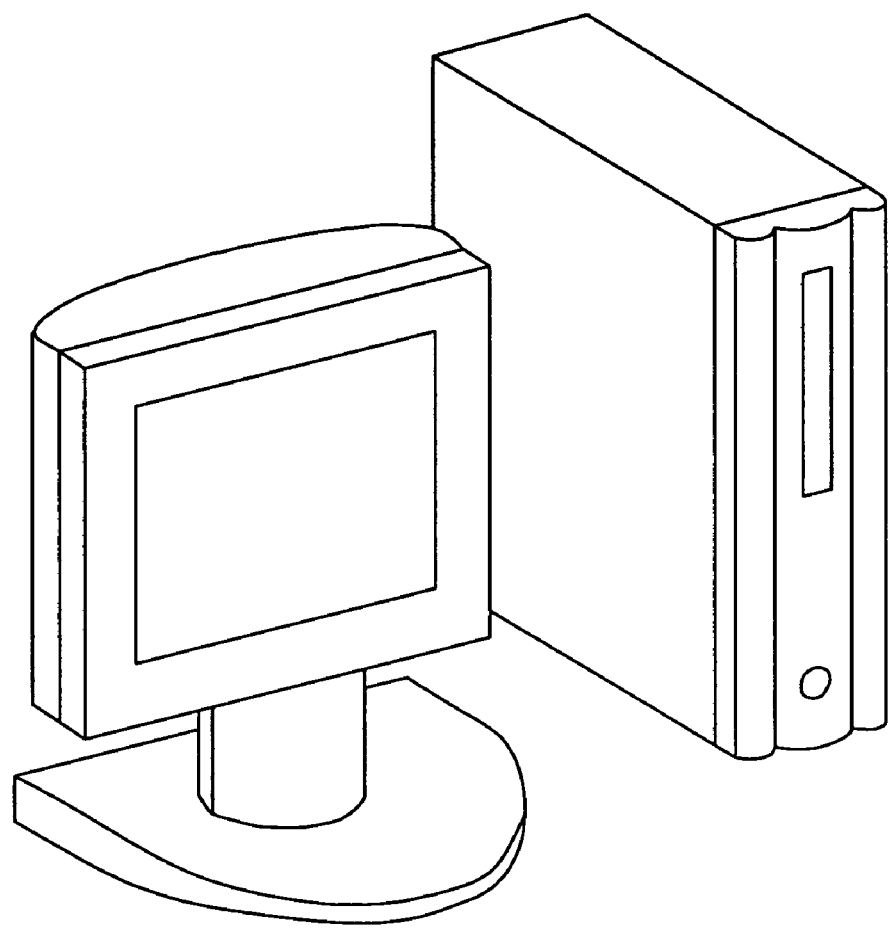
FIG. 20 shows a perspective view of a desktop-type personal computer to which the present invention is applicable.

Furthermore, the present invention may be applied not only to a cellular phone, but the present invention may be widely applied to any electronic device such as a notebook-type personal computer, a desktop-type personal computer such as those shown in FIGS. 19 and 20, or such, configured to contain a plurality of functions together within the single electronic device, to display them in a form of a menu or a similar way, and to have a user who views it then select a desired function.

The present invention includes configurations recited in the following items:

1) A device for selecting a desired item from a menu including a predetermined plurality of items, including:
   a means with which the plurality of items of the menu are arranged circularly, and a direction of rotation of the circular menu is designated; and
   a means with which the circular menu is rotated for a plurality items at once when a direction different from the direction of rotation is designated.

2) The device as mentioned in the item 1), wherein:
   the above-mentioned means with which the circular menu is rotated for a plurality of items at once is configured to cause rotation up to the item located at the opposite location in the circular menu at once.

3) The device as mentioned in the item 1) or 2), further including:
   a means with which the circular menu is displayed.

4) The device as mentioned in the item 3), wherein:
   the above-mentioned means with which the circular menu is displayed displays only part of the items of the circular menu.

5) The device as mentioned in the item 3) or 4), wherein:
   the above-mentioned means with which the circular menu is displayed includes a means with which a way of displaying each item of the circular menu is changed depending on the position thereof, and the display way of each item is changed sequentially in response to change in the position of each item according to the rotation of the circular menu.

6) The device as mentioned in the item 5), wherein:
   the above-mentioned means with which the display way of each item of the circular menu is changed depending on the position thereof is configured to change a display size of the item sequentially.

7) The device as mentioned in the item 5), wherein:
   the above-mentioned means with which the display way of each item of the circular menu is changed depending on the position thereof is configured to change display sharpness of the item sequentially.

8) The device as mentioned in any one of the items 1) through 4), wherein:
   the above-mentioned means with which the rotation direction of the circular menu and the direction different therefrom are designated is made of a cross-shaped key.

9) The device as mentioned in any one of the items 1) through 8), wherein:
   the plurality of items correspond to functions which are executed by a predetermined electronic device.

10) The device as mentioned in any one of the items 1) through 9), wherein the above-mentioned electronic device is a cellular phone.

11) The device as mentioned in any one of the items 1) through 9), wherein the above-mentioned electronic device is a computer.

12) A method for selecting a desired item from a menu including a predetermined plurality of items, including the steps of:
   arranging the plurality of items of the menu circularly;
   designating a rotation of a direction of the arrangement of the circular menu; and
   rotating the circular menu for a plurality items at once when a direction different from the direction of the rotation of the circular menu is designated.

13) The method as mentioned in the item 12), wherein:
   in the step of rotating the circular menu for a plurality of items, the circular menu is rotated up to the item located at the opposite location in the circular menu at once.

14) The method as mentioned in the item 12) or 13), further including the step of:
   displaying the circular menu.

15) The method as mentioned in the item 14), wherein:
   in the above-mentioned step of displaying the circular, only part of the items of the circular menu is displayed.

16) The device as mentioned in the item 14) or 15), wherein:
   the above-mentioned step of displaying the circular menu includes the step of changing a way of displaying each item of the circular menu depending on the position thereof, and changing the display way of each item sequentially in response to change in the position of each item according to the rotation of the circular menu.

17) The method as mentioned in the item 16), wherein:
   in the above-mentioned step of changing the display way of each item of the circular menu depending on the position thereof, a display size of the item is changed sequentially.

18) The method as mentioned in the item 16 or 17, wherein:
   in the above-mentioned step of changing display way of each item of the circular menu depending on the position thereof, display sharpness of the item is changed sequentially.

19) The method as mentioned in any one of the items 12) through 18), wherein:
   a means with which the rotation direction of the circular menu and the direction different therefrom are designated is made of a cross-shaped key.

20) The method as mentioned in any one of the items 12) through 19), wherein:
   the plurality of items correspond to functions which are executed by a predetermined electronic device.

21) The method as mentioned in any one of the items 12) through 20), wherein the above-mentioned electronic device is a cellular phone.

22) The method as mentioned in any one of the items 12) through 21), wherein the above-mentioned electronic device is a computer.

Thus, according to the present invention, even in a menu including many items, it is possible to reach a desired item with a relatively small amount of operation, to start a desired function rapidly in a case where the present invention is applied to a cellular phone or such, and thus, to drastically improve the user friendliness in the device.

The invention claimed is:

1. A device for selecting a desired item from a menu comprising a predetermined plurality of items, comprising:
   a first part which arranges the plurality of items of said menu circularly, a first direction of rotation of the circular menu being designated;
   a second part which rotates said circular menu in a second direction, different from said first direction of rotation, when the second direction is designated, and
   an up-down-left-right direction operation key, wherein:
   when a single operation in a left-right direction of the up-down-left-right direction operation key is made, said second part rotates the circular menu in the first direction, one item every time, and when a single operation in an up-down direction of the up-down-left-right direction operation key is made, said second part rotates the circular menu automatically such that an item located at an opposite position, relative to a front position, rotates 180° to the front position.

2. The device as claimed in claim 1, further comprising: a part with which said circular menu is displayed.

3. The device as claimed in claim 2, wherein: said part with which said circular menu is displayed comprises a part with which a way of displaying each item of said circular menu is changed depending on the position thereof, and the display way of each item is changed sequentially in response to a change in the position of each item according to the rotation of the circular menu.

4. The device as claimed in claim 3, wherein: said plurality of items correspond to functions which are executed by a predetermined electronic device.

5. The device as claimed in claim 2, wherein: said plurality of items correspond to functions which are executed by a predetermined electronic device.

6. The device as claimed in claim 1, wherein: said plurality of items correspond to functions which are executed by a predetermined electronic device.

7. A computer-executable method for selecting a desired item from a menu comprising a predetermined plurality of items, comprising:
arranging the plurality of items of said menu circularly in a first direction; and
rotating the circular menu of the plurality of items in a second direction, different from the first direction, when the second direction is designated, wherein:
the rotating of the circular menu in the designated, second direction is caused using an up-down-left-right direction operation key, and:
when a single operation in a left-right direction of the up-down-left-right direction operation key is made, the circular menu rotates in its arranged first direction, one item every time, and, when a single operation in an up-down direction of the up-down-left-right direction operation key is made, the circular menu automatically rotates such that an item located at an opposite position, relative to a front position, rotates 180° to the front position.

8. The method as claimed in claim 7, further comprising: displaying said circular menu.

9. The method as claimed in claim 8, wherein: said displaying said circular menu comprises changing a way of displaying each item of said circular menu depending on the position thereof, and changing the display way of each item sequentially in response to a change in the position of each item according to the rotation of the circular menu.

10. The method as claimed in claim 9, wherein: said plurality of items correspond to functions which are executed by a predetermined electronic device.

11. The method as claimed in claim 8, wherein: said plurality of items correspond to functions which are executed by a predetermined electronic device.

12. The method as claimed in claim 7, wherein: said plurality of items correspond to functions which are executed by a predetermined electronic device.

13. A method for selecting a desired item from a menu comprising a predetermined plurality of items, comprising:
arranging the plurality of items of said menu circularly in a first direction;
rotating the circular menu of the plurality of items in a second direction, different from the first direction, when the second direction is designated;
causing the rotating of the circular menu in the designated, second direction by using an up-down-left-right direction operation key;
rotating the circular menu in its arranged first direction, one item every time, when a single operation in a left-right direction of the up-down-left-right direction operation key is made; and,
rotating the circular menu automatically such that an item located at an opposite position, relative to a front position, rotates 180° to the front position when a single operation in an up-down direction of the up-down-left-right direction operation key is made.

* * * * *